US012658682B2

(12) United States Patent
Franssen et al.

(10) Patent No.: US 12,658,682 B2
(45) Date of Patent: Jun. 16, 2026

(54) FRANCLAMP WIRE MANAGEMENT SYSTEM AND DEVICE

(71) Applicant: Franman Innovations LLC, Athol, ID (US)

(72) Inventors: Hunter Franssen, Coeur D'Alene, ID (US); Randall Franssen, Coeur D'Alene, ID (US); Clinton Washburn, Coeur D'Alene, ID (US)

(73) Assignee: Franman Innovations LLC, Athol, ID (US)

( * ) Notice: Subject to any disclaimer, the term of this patent is extended or adjusted under 35 U.S.C. 154(b) by 0 days.

(21) Appl. No.: 18/515,401

(22) Filed: Nov. 21, 2023

(65) Prior Publication Data

US 2025/0202211 A1    Jun. 19, 2025

Related U.S. Application Data

(63) Continuation-in-part of application No. 16/921,855, filed on Jul. 6, 2020, now Pat. No. 11,824,338, which is a continuation of application No. 15/791,488, filed on Oct. 24, 2017, now Pat. No. 10,707,662.

(51) Int. Cl.
*H02G 3/16* (2006.01)
*H02G 3/08* (2006.01)

(52) U.S. Cl.
CPC .............. *H02G 3/083* (2013.01); *H02G 3/16* (2013.01)

(58) Field of Classification Search
CPC .................................. H02G 3/083; H02G 3/16
USPC ......................................................... 174/666
See application file for complete search history.

(56) References Cited

U.S. PATENT DOCUMENTS

| | | | | |
|---|---|---|---|---|
| 7,955,125 | B1 * | 6/2011 | Petrillo .................. | H01R 31/06 |
| | | | | 439/535 |
| 8,124,891 | B1 * | 2/2012 | Gretz .................... | H02G 3/0691 |
| | | | | 174/653 |
| 8,242,369 | B2 * | 8/2012 | Kiely ................... | H02G 3/0691 |
| | | | | 174/84 R |
| 8,513,543 | B1 * | 8/2013 | Lin ....................... | H02G 15/013 |
| | | | | 174/656 |
| 9,252,577 | B1 * | 2/2016 | Smith ................... | H02G 15/076 |
| 9,438,019 | B2 * | 9/2016 | Plathe .................. | H02G 3/0625 |

* cited by examiner

*Primary Examiner* — Timothy J Thompson
*Assistant Examiner* — Michael F Mcallister
(74) *Attorney, Agent, or Firm* — Hawley Troxell; Rivkah Young

(57) ABSTRACT

A wire management system and device facilitates the connection of electrical wires or cables to an electrical box or electrical panel by providing a fitting body having engagements configured to engage with an aperture of the electrical box or electrical panel. A plurality of cable apertures are configured within the fitting body to allow wires or cables of varying sizes to pass through the fitting body, and a plurality of cable clamping members are utilized to keep the wires or cables securely fixed within the cable apertures.

16 Claims, 8 Drawing Sheets

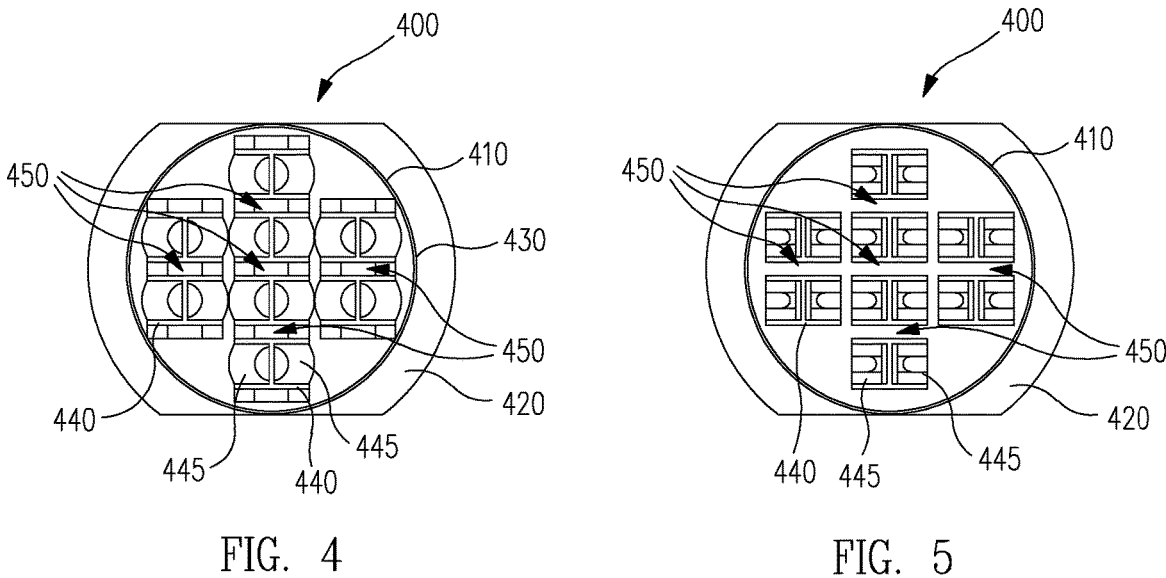
FIG. 4                                      FIG. 5
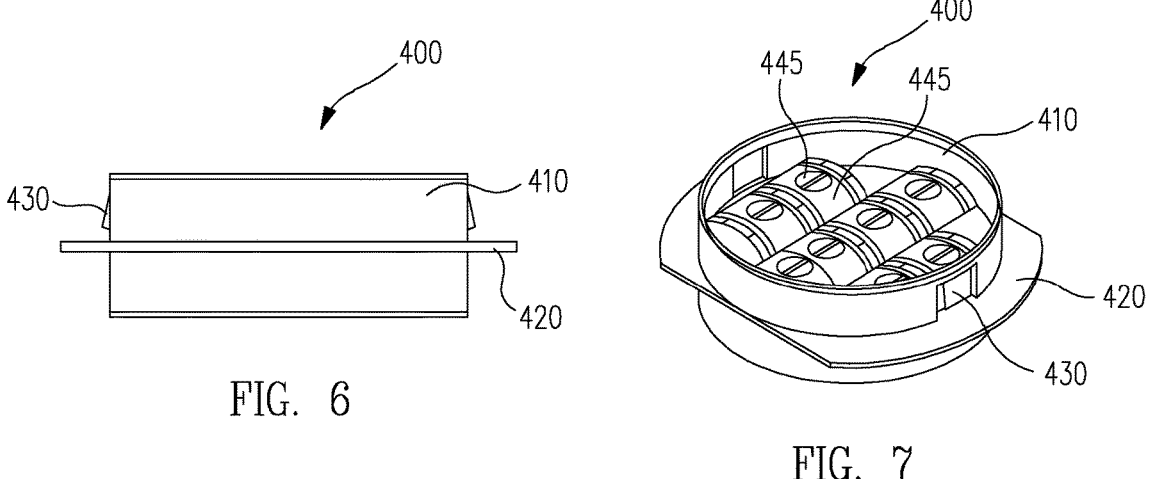
FIG. 6
FIG. 7

800 810 820 830

400

900

FRANCLAMP WIRE MANAGEMENT SYSTEM AND DEVICE

CROSS-REFERENCE TO RELATED APPLICATIONS

This application is a continuation-in-part of U.S. patent application Ser. No. 16/921,855 filed on Jul. 6, 2020 and entitled FRANCLAMP WIRE MANAGEMENT SYSTEM AND DEVICE to inventor Hunter Franssen, which is a continuation application claiming priority to U.S. patent application Ser. No. 15/791,488 filed on Oct. 24, 2017 and entitled FRANCLAMP WIRE MANAGEMENT SYSTEM AND DEVICE to inventor Hunter Franssen, the entirety of which each are herein incorporated by reference.

BACKGROUND OF THE INVENTION

1. Field of the Invention

The present invention relates to a wire management system and device for an electrical panel. Specifically, the wire management device relates to managing electrical cables and connectors which are routed through a cable management hole or knockouts in an electrical panel.

2. Description of the Related Art

Known wire management devices for routing cabling through an electrical panel generally include a decorative grommet or cap having an opening to allow a cable to pass therethrough or include a pop-up or fixed electrical outlet extending from a cable management hole and protruding above the electrical panel.

One such known device includes a cylindrical sleeve that extends the depth of a cable management hole through an electrical panel. Additionally, the device includes a disk-shaped cap or grommet which defines an opening along its circumference to accommodate the passage of cables therethrough. The sleeve and grommet combination functions to secure a cable passing therethrough and to provide a closure to the cable management hole through the electrical panel. Connection or disconnection of the cable sockets must be inconveniently completed from the space under the electrical panel.

Other known wire management devices provide electrical cable routing through a cable management hole in an electrical panel by providing a pop-up or fixed element extending from the cable management hole and protruding above the electrical panel. Such devices are rather expensive, and the popup protrudes above the electrical panel in an unsightly and inconvenient manner.

Another known device includes the Qwik-grip wire management device and although this device has many of the advantages of the present invention, it is currently limited to the factory installed proprietary knockouts available to run the cables into. Further, all single connectors are capable of only 1 to 2 cables no matter how large the knockout is while the present invention offers a number of single connection clamps with one much larger knockout legally allowing up to 24 cables to come through one single large hole.

When installing a load center or doing a rough-in, knockouts typically present difficulties for electrical contractors in terms of the time and effort required to complete them. The present invention bypasses the knockouts, connectors, getting the wires in and so forth. The present invention therefore will save time off of each load center installation and enhances electrical contractors' efficiency and productivity on the job site.

The present invention makes rough-ins easier by removing the need for excessive knockouts and wire connectors while reducing the likelihood of installation mistakes, call backs and the number of parts needed. The invention also makes remodeling jobs and service changes easier and more straightforward.

BRIEF SUMMARY OF THE INVENTION

The present disclosure describes wire management system and device for facilitating the connection of electrical wires to an electrical panel. The device includes a circular bracket as base member consisting of a series of intersecting rectangular apertures or openings that has a plurality of retention elements in the form of snap-ons or tabs.

Advantageously, the wire management device is adapted for use with electrical panels having existing standard sized cable management holes or knockouts.

An additional advantage is that the wire management device can be inexpensively constructed from a single die cut and/or molded piece of plastic or similar material.

Yet a further advantage of the wire management device is that supported electrical wire can easily be pulled off and others installed into the wire management device without the use of tools.

A further advantage of the wire management device is that the intersecting rectangular apertures provide support for a plurality of various sized cables and wires.

A further advantage of the wire management device is the ease of installation. The present invention simplifies rough-ins by significantly reducing the number of knockouts needed for each load center installation.

A further advantage of the wire management device is that it substantially reduces the amount of work required. A user spends less time unlinking wires, pulling wire through knockouts, struggling with frozen knockouts, installing filler plugs and counting out dozens of connectors to bring to each job site.

A further advantage of the wire management device is that it speeds up wire installation, simplifying the rough-in. User has no need to remove excessive knockouts, installing wire connectors, and blindly pulling wire into a load center.

A further advantage of the wire management device is that it provides a great alternative as a retrofit for service upgrades, remodels or just adding a circuit. It is easily removed leaving a convenient opening to pull in the existing branch circuits.

While this invention has been described as having exemplary embodiments and scenarios, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

BRIEF DESCRIPTION OF THE DRAWINGS

The above-mentioned and other features and advantages of this invention, and the manner of attaining them, will become more apparent and the invention will be better understood by reference to the following description of the embodiments of the invention taken in conjunction with the accompanying drawings wherein:

FIG. 4 is a front view of an alternative embodiment of a wire management device.

FIG. 5 is a rear view of the wire management device of FIG. 4.

FIG. 6 is a bottom view of the wire management device of FIG. 4.

FIG. 7 is a perspective view of the wire management device of FIG. 4.

Figure 1:
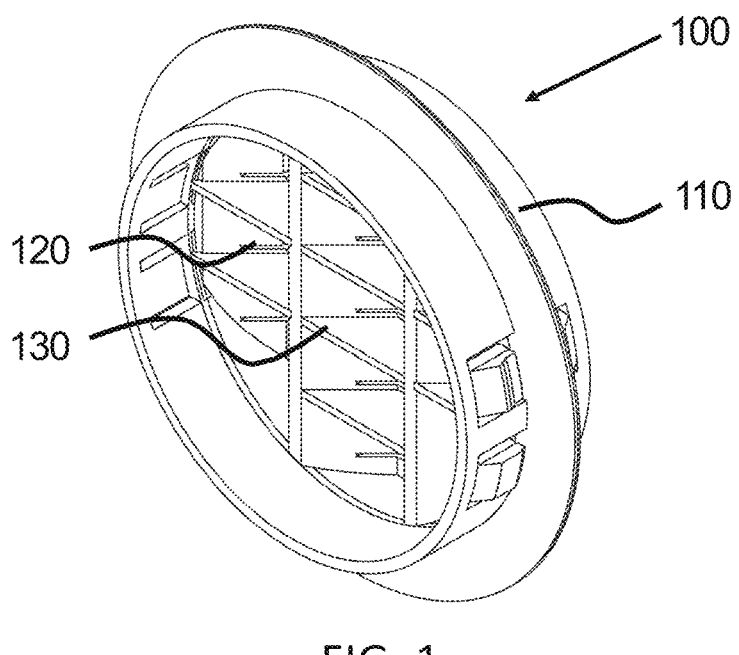
FIG. 1 is a perspective view of a wire management device according to one form of the present invention.
Figure 2:
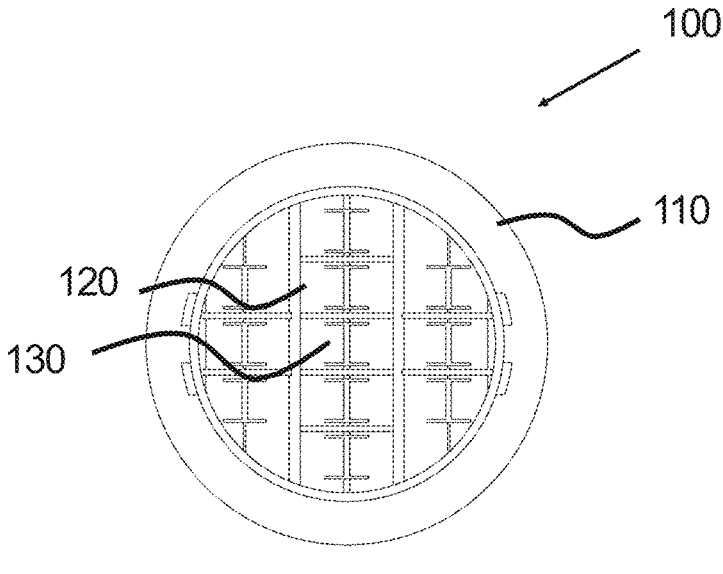
FIG. 2 is a top view of the wire management device of FIG. 1.
Figure 3:
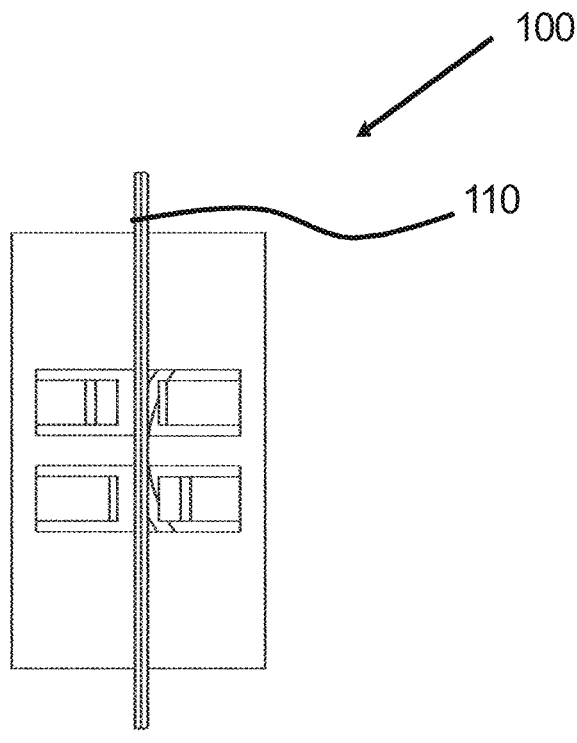
FIG. 3 is a side view taken along section lines of the wire management device of FIG. 2.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates preferred embodiments of the invention and such exemplifications are not to be construed as limiting the scope of the invention in any manner.

DETAILED DESCRIPTION

The present invention provides a wire management device which traps and clamps electrical cords and nonmetallic sheathed cable commonly known as NMB or Romex wires to an electrical panel which minimizes and obviates the disadvantages of the prior art.

It is a specific object of the present invention to provide a cable clamping apparatus which applies multimode clamping forces to cables in a wide range of diameters without causing damaging or compromising effects to the cables.

It is a more specific object of the present invention to provide a cable clamping apparatus which includes a number of single connection clamps with a much larger knockout legally allowing up to 24 cables to come through one single large electrical knockout.

These objects are accomplished in one form according to the present invention by providing a number of apertures through which the cables are clamped. The device has a number of chambers and each of them will hold up to two cables and each cable or wire in the chamber is separated by a plastic or non-electrically conductive barrier/divider, such as dividers 450 shown in FIG. 4 and FIG. 5. In one embodiment, dividers 450 can be removed to accommodate larger cable sizes.

A first embodiment of the inventive wire management device 100 provides a plate 110 for supporting at least one/multiple cables or wires. The plate defines a number of apertures 120 to allow the electrical wires to pass through and a snap 130 on the device shield to keep the wires behind for a secure, code compliant installation. The plate may be fastened directly to the top, underside, interior, and/or exterior of an electrical panel or side factory stamped knockout.

In one form, the present invention provides a device for allowing a plurality of different sized electrical wires to pass through intersecting rectangular apertures defined within the device.

Referring now to FIGS. 4-7, another embodiment of a wire management device 400 is depicted. Wire management device 400 includes a conduit/fitting body 410 which is configured to fit into an aperture or knock-out of an electrical fuse (breaker) box or load box intended to pass electrical lines therethrough. A rim 420 is configured to interface with a side of an electrical box when inserted into an aperture in the side of the electrical box. An engagement feature 430 at one or more locations on conduit/fitting body 410 is configured to help maintain wire management device 400 engaged with the electrical box aperture. Engagement feature 430 may include but is not limited to flexible tabs or clips or threaded portions including threads going around the circumference of portions of the conduit/fitting body 410 configured to engage with the fuse box. A plurality of cable apertures 440 with cable clamping members 445 are configured to hold cables extending through any of the plurality of cable apertures 440 substantially in place and avoid causing damage to the cable insulation. Cable apertures 440 may be of any shape or size and are not limited to the shape, size, or arrangement depicted in the Figures. Cable clamping members 445 may also be configured in various shapes and configuration without departing from the scope of the subject matter.

Figure 8:
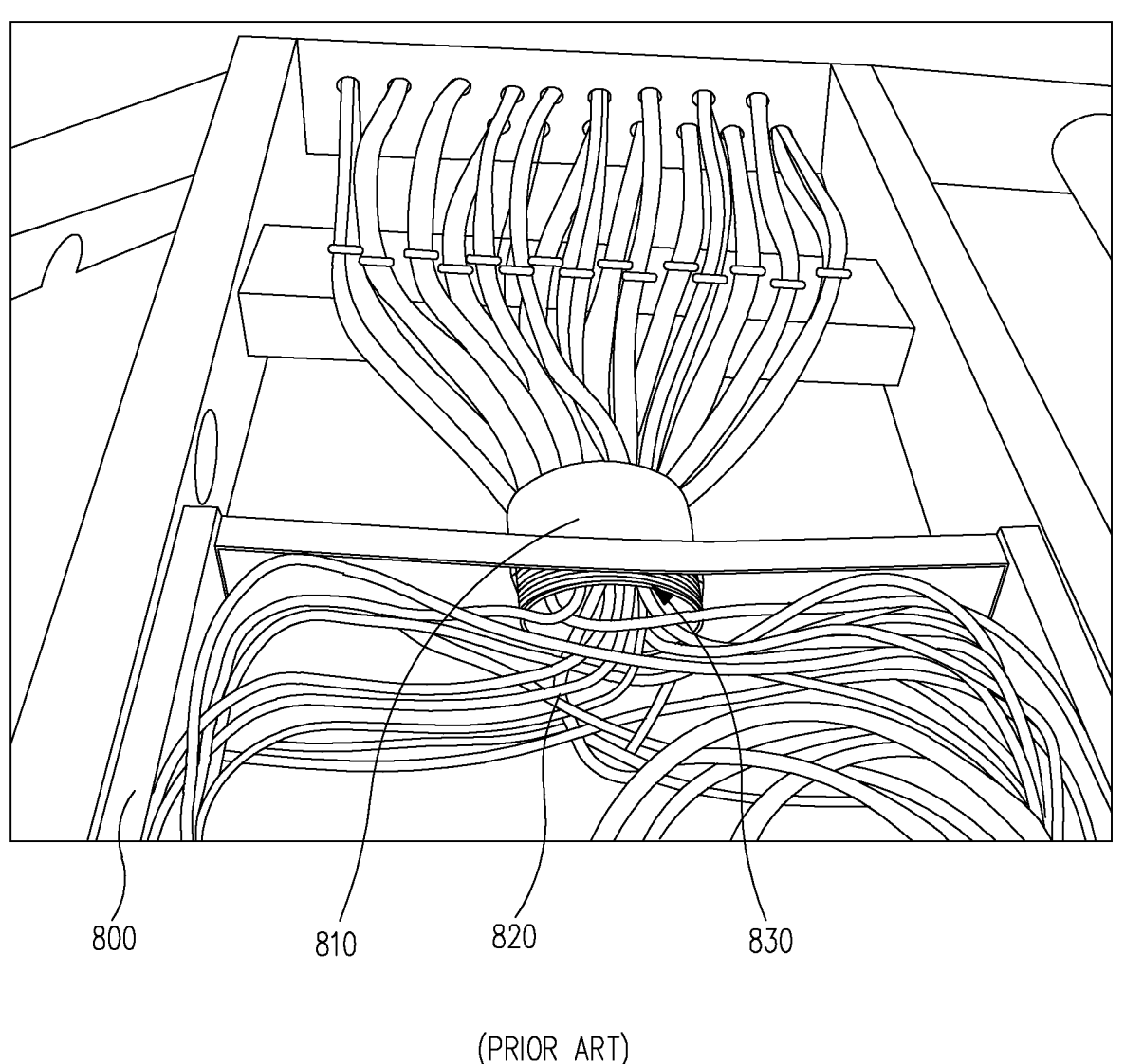
FIG. 8 is a depiction of a conventional electrical box having a conventional conduit/fitting for containing cables.
Figure 9:
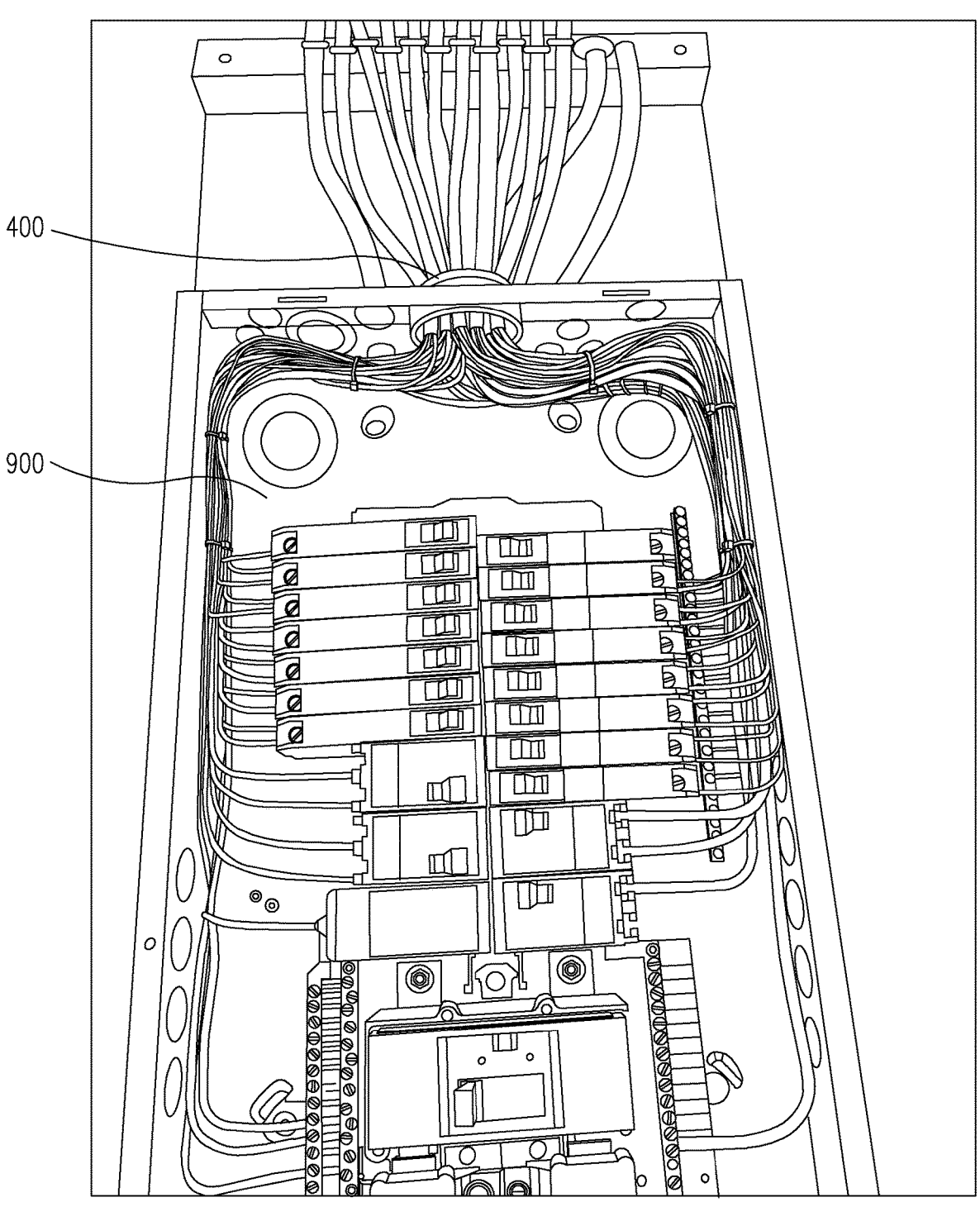
FIG. 9 is a depiction of an electrical box having a wire management device for organizing cables.
Figure 10:
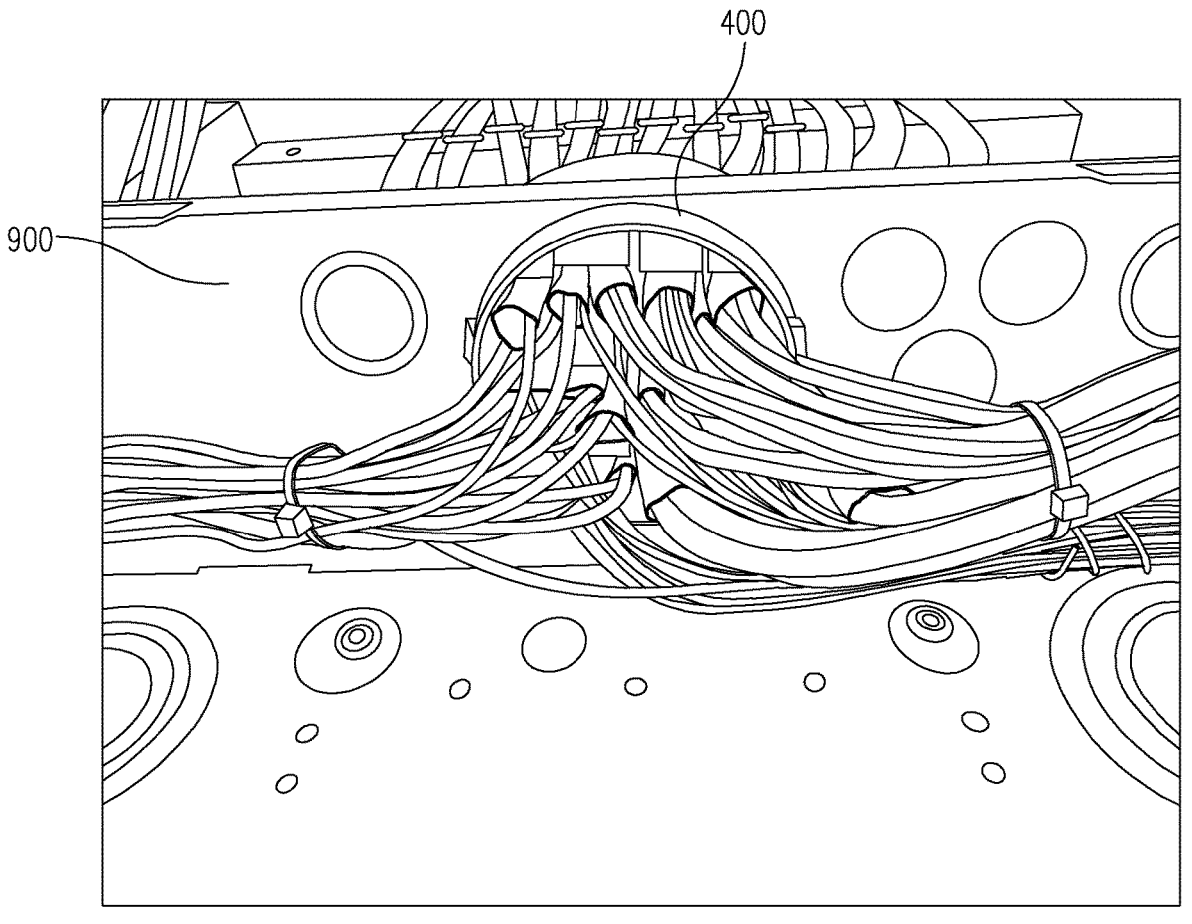
FIG. 10 is a bottom perspective view of the wire management device installed in the electrical box of FIG. 9.
Figure 11:
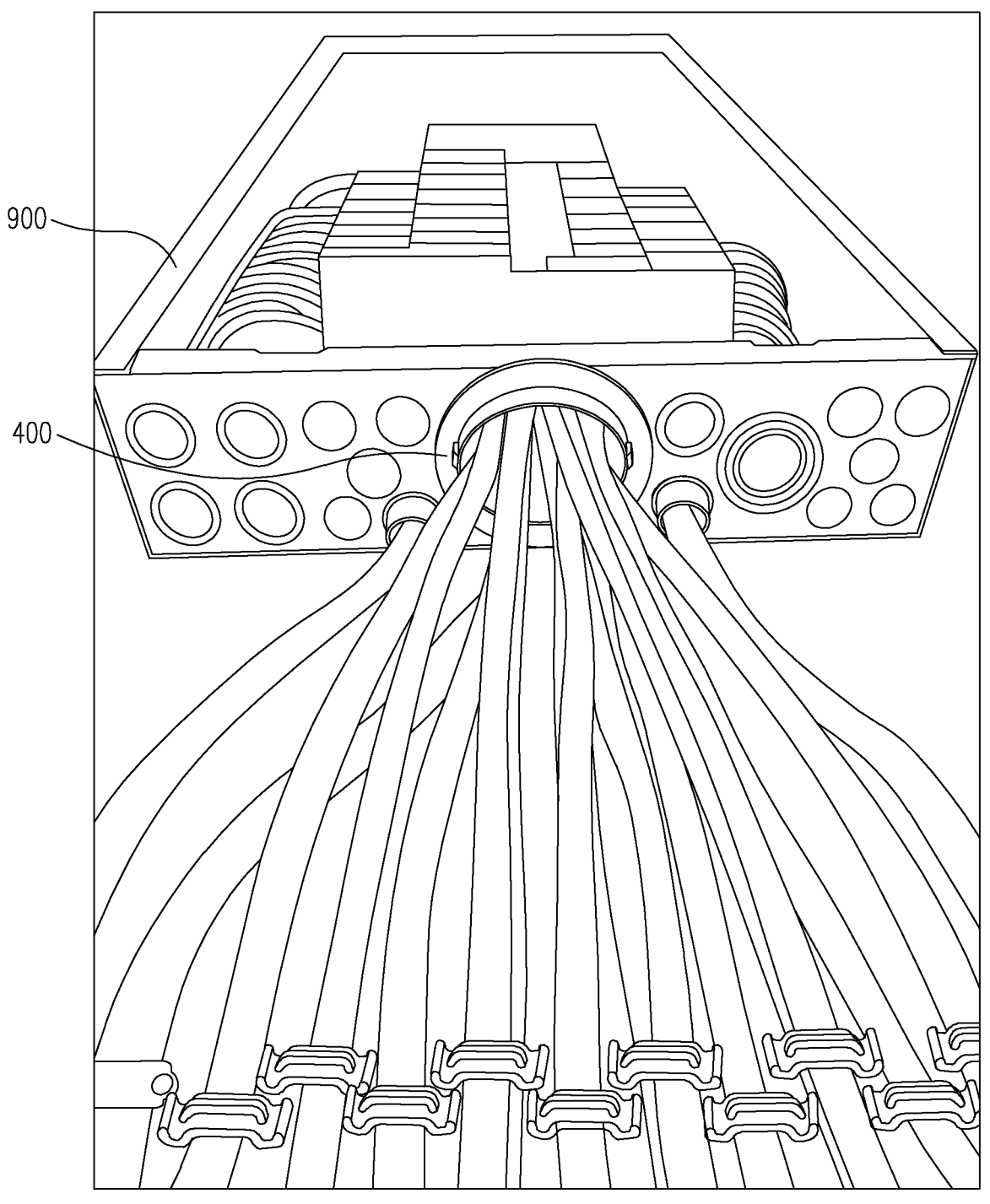
FIG. 11 is a top perspective view of the electrical box and wire management device of FIG. 9.

Referring now to FIG. 8, an electrical box 800 is depicted which uses a conventional collar 810 which provides no support for organizing cables 820. Conventional conduits/fittings like conduits/fittings 830 tend not to provide organization for cables 820. Referring to FIGS. 9-11, wire management device 400 is depicted installed in an electrical box 900. Wire management device 400 as depicted helps to maintain organization of the cable installation in and out of electrical box 900, as depicted.

What is claimed is:

1. A wire management device for an electrical box or electrical panel, comprising:
   a fitting body having one or more engagements configured to engage with an aperture of the electrical box or electrical panel;
   a plurality of cable apertures configured within the fitting body, the cable apertures configured to allow a plurality of wires or cables to pass through the fitting body; and
   a plurality of cable clamping members configured to keep the wires or cables securely fixed within the cable apertures.

2. The wire management device of claim 1, wherein said fitting body includes a rim.

3. The wire management device of claim 1, wherein the engagements include flexible clips.

4. The wire management device of claim 1, wherein the engagements include threads configured to engage with the aperture of the electrical box or electrical panel.

5. The wire management device of claim 1, wherein the plurality of wires or cables include wires or cables that vary in size.

6. The wire management device of claim 1, wherein the cable apertures are sized and arranged to accept any one of the plurality of wires or cables, including wires or cables that vary in size.

7. The wire management device of claim 1, wherein one or more of the cable apertures include one or more dividers configured to separate the wires or cables when more than one wire or cable passes through the fitting body.

8. The wire management device of claim 7, wherein the one or more dividers are removable.

9. A knockout adapter for an electrical box or electrical panel, comprising:

a base member;

one or more engagement means coupled to the base member, the engagement means configured to engage with a knockout aperture of the electrical box or electrical panel;

a plurality of cable apertures configured within the base member, the cable apertures providing support for a plurality of wires or cables that are passed through the base member; and a plurality of cable clamping members configured to keep the wires or cables securely fixed within the cable apertures.

10. The knockout adapter of claim 9, wherein said base member includes a rim.

11. The knockout adapter of claim 9, wherein the engagement means include flexible clips.

12. The knockout adapter of claim 9, wherein the engagement means include threads on one or more portions of the base member.

13. The knockout adapter of claim 9, wherein the plurality of wires or cables include wires or cables that vary in size.

14. The knockout adapter of claim 9, wherein the cable apertures are sized and arranged to accept any one of the plurality of wires or cables, including wires or cables that vary in size.

15. The knockout adapter of claim 9, wherein the cable apertures are defined by one or more dividers.

16. The knockout adapter of claim 15, wherein the one or more dividers are removable.

* * * * *